United States Patent
McPherson et al.

(10) Patent No.: US 10,311,062 B2
(45) Date of Patent: Jun. 4, 2019

(54) FILTERING STRUCTURED DATA USING INEXACT, CULTURE-DEPENDENT TERMS

(75) Inventors: Jonathan McPherson, Redmond, WA (US); Cameron Elliot Smith, Bellevue, WA (US); David Michael Jade, Bellevue, WA (US); Joseph Milan Filcik, Bellevue, WA (US); Juventino Rojas Arredondo, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 13/590,206

(22) Filed: Aug. 21, 2012

(65) Prior Publication Data

US 2014/0059038 A1 Feb. 27, 2014

(51) Int. Cl.
*G06F 17/30* (2006.01)
*G06F 16/2457* (2019.01)

(52) U.S. Cl.
CPC .............. *G06F 16/24575* (2019.01)

(58) Field of Classification Search
USPC ....................................... 707/742
See application file for complete search history.

(56) References Cited

U.S. PATENT DOCUMENTS

| | | | |
|---|---|---|---|
| 6,453,315 B1 | 9/2002 | Weissman et al. | |
| 7,373,341 B2* | 5/2008 | Polo-Malouvier | |
| 7,668,825 B2 | 2/2010 | Vogel et al. | |
| 7,698,259 B2 | 4/2010 | Xue | |
| 7,844,587 B2 | 11/2010 | Blakeley et al. | |
| 2004/0122807 A1 | 6/2004 | Hamilton et al. | |
| 2005/0262440 A1* | 11/2005 | Stanciu et al. ................ 715/523 |
| 2006/0101013 A1* | 5/2006 | Kenney ............. G06F 17/30398 |
| 2006/0288286 A1* | 12/2006 | Chandler et al. ............. 715/716 |
| 2007/0028214 A1* | 2/2007 | Shu ........................ G06F 9/4448 717/120 |
| 2007/0244853 A1* | 10/2007 | Schneider ............. G06F 9/4448 |
| 2007/0250855 A1* | 10/2007 | Quinn-Jacobs .............................. G06F 17/30696 725/35 |
| 2009/0210216 A1* | 8/2009 | Arora .................... G06F 9/4448 704/8 |
| 2010/0281314 A1* | 11/2010 | Pettinati ......................... 714/57 |

(Continued)

OTHER PUBLICATIONS

Lesieur, David, "Faceted Search" Retrieved at <<http://drupal.org/project/faceted_search>>, May 19, 2007, pp. 3.

*Primary Examiner* — Thu N Nguyen
(74) *Attorney, Agent, or Firm* — Schwegman Lundberg & Woessner, P.A.

(57) ABSTRACT

Technologies are described herein for filtering data in a result set using inexact and/or culture dependent terms. A user provides one or more filter terms for filtering a result set being viewed. One or more data type interpretations are determined for each filter term based on the value of the term. The data type interpretations may further be based on a locale associated with the user. For each filter term, the columns of the result set to which the filter term is to be applied is selected based on the data type interpretations determined for the filter term and the data types of the columns. The filter terms are then applied to the selected columns of the result set, thus causing the rows of the result set as displayed to the user to be limited to rows wherein at least one column value satisfies a filter term.

18 Claims, 5 Drawing Sheets

(56) References Cited

U.S. PATENT DOCUMENTS

| | | |
|---|---|---|
| 2011/0040745 A1 | 2/2011 | Zaydman et al. |
| 2012/0166465 A1* | 6/2012 | Teichmann ....... G06F 17/30471 707/765 |
| 2013/0007645 A1* | 1/2013 | Kurniawan ......... G06F 3/04847 715/769 |
| 2013/0073559 A1* | 3/2013 | Hornkvist et al. ............ 707/742 |

* cited by examiner

FILTERING STRUCTURED DATA USING INEXACT, CULTURE-DEPENDENT TERMS

BACKGROUND

Finding information in structured databases typically requires complex queries that are dependent on the underlying database schema and that must carefully manipulate user input. The inputs required are typically not compatible with the way the data is stored. This is because the same information can be expressed in different ways in different countries of the world. For example, the term "1,230" may seem like the number "one thousand two hundred thirty" to someone in the United States, but it looks like "one point twenty three" for some in Germany. This is particularly applicable to date fields, where the text "1/12/2010" may mean Jan. 12, 2010 in the United States but Dec. 1, 2010 in other countries of the world.

In addition, sometimes the information one is looking for is not exactly represented in the database. For example, a search for "1.23" may not find the number 1.232 stored in the database because of the nature of storage of numeric data, even though we may be interested in such a result. Further, traditional queries require the user to specify where the information is supposed to be found. For example, a person may wish to retrieve all results containing the number 1.23 even if she does not remember what column in the database that value can be found in.

It is with respect to these considerations and others that the disclosure made herein is presented.

SUMMARY

Technologies are described herein for filtering data in a result set using inexact and/or culture dependent terms. Utilizing the technologies described herein, a mechanism may be implemented that accepts filter terms from a user, as opposed to complex structured-query language ("SQL") queries, interprets the culture-dependent meaning from the terms, broadens the filter terms to ensure that results of interest are found, and creates a sophisticated query from the terms that will retrieve a result set containing data that the user is most interested in. The mechanism includes a user interface ("UI") that allows users to enter the filter terms for which they are looking instead of having to build a complex query expression. In this way, the user may provide a specification of what they are looking for in the data, without the complexity of specifying where they want to search for it or how that information should be searched in the underlying database.

According to embodiments, a user may enter one or more filter terms in a search box for filtering a result set being viewed on a display. One or more data type interpretations are determined for each filter term based on the value of the term. In some embodiments, the data type interpretations may further be based on a locale associated with the user providing the filter terms. For each filter term, the columns of the result set to which the filter term is to be applied is selected based on the data type interpretations determined for the filter term and the data types of the columns. The filter terms are then applied to the selected columns of the result set, thus causing the rows of the result set as displayed to the user to be limited to rows wherein at least one column value satisfies a filter term.

It will be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for filtering data in a result set using inexact and/or culture dependent terms. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, distributed systems, and the like.

In the following detailed description, references are made to the accompanying drawings that form a part hereof and that show, by way of illustration, specific embodiments or examples. In the accompanying drawings, like numerals represent like elements through the several figures.

Figure 1:
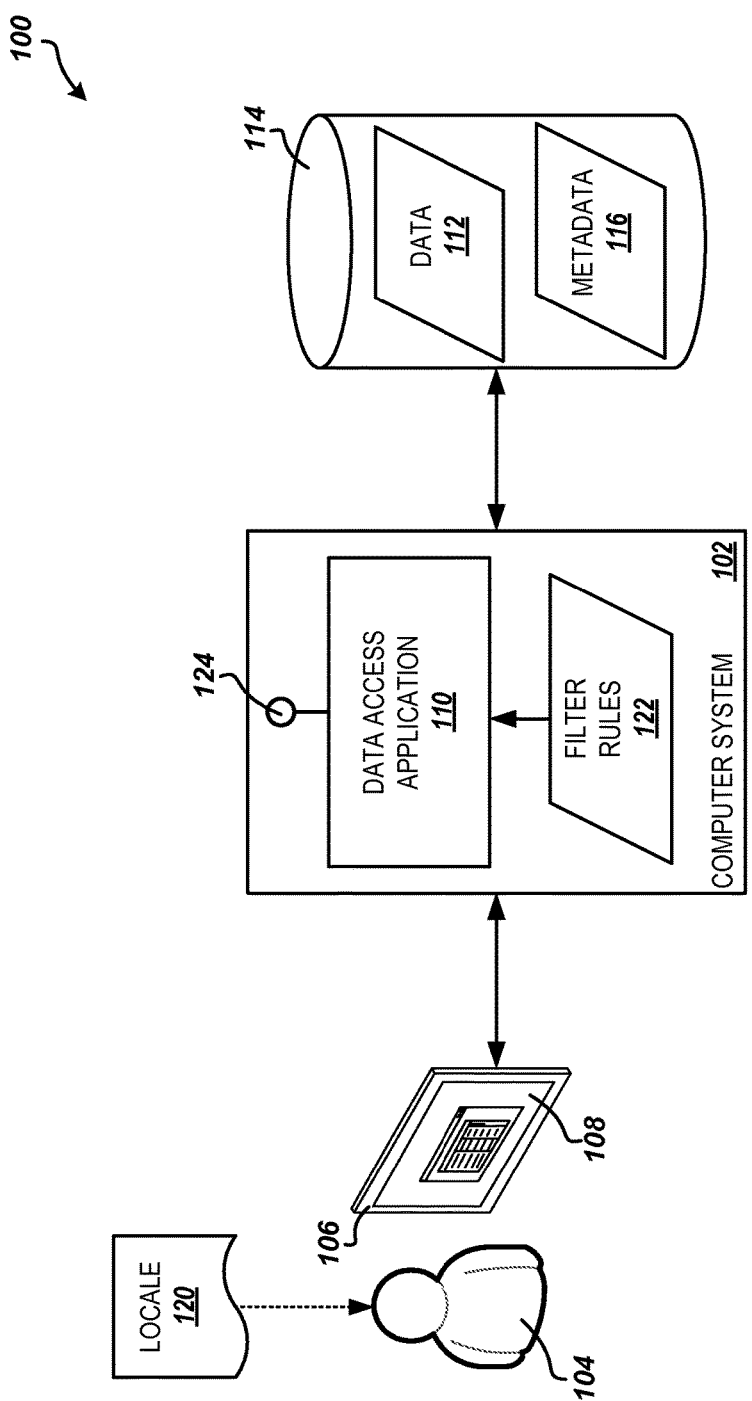
FIG. 1 is a block diagram showing aspects of an illustrative operating environment and software components provided by some embodiments presented herein.

FIG. 1 shows an illustrative operating environment 100 including software components for filtering data in a result set using inexact and/or culture dependent terms, according to embodiments provided herein. The environment 100 includes a computer system 102. The computer system 102 may represent a user computing device, such as a tablet device, a personal computer ("PC"), a desktop workstation, a laptop, a notebook, a mobile device, a personal digital assistant ("PDA"), a smart phone, a game console, a set top box, or any other computing device known in the art.

Alternatively, the computer system 102 may represent a user computing device operatively connected to one or more application servers, Web servers, database servers, or the like. The computer system 102 may be a component of a cloud-based computing platform comprising application servers, Web servers, database servers, storage systems, network appliances, dedicated hardware devices, and/or other server computers or computing devices known in the art. The computer system 102 may be connected to the user computing device by one or more networks, such as LANs, WANs, the Internet, or a combination of these and other networking infrastructure known in the art. The computer system 102 may be accessed by a user 104, through a display device 106 and one or more input devices, such as a touchscreen 108 found on a tablet device, as shown in FIG. 1. It will be appreciated that the input devices may also include a keyboard and/or a mouse.

According to embodiments, a data access application 110 executes on the computer system 102 that allows the user 104 to access structured data 112 maintained in a database 114 or other storage mechanism operatively connected to the computer system. The data access application 110 may allow the user 104 to create, modify, view, and query the structured data 112 through customized or data-specific UI forms and display elements on the display device 106. The data access application 110 may execute locally on the user computing device of the computer system 102, or may execute on one or more server computers of the computer system and be accessed by a client application on the user computing device. For example, the client application may be a Web browser application executing a Web-based application retrieved from a Web server in a cloud-based computing platform. The data access application 110 may be implemented as hardware, software, or a combination of the two. In addition, the data access application 110 may comprise any number of application program modules and other components executing on the computer system 102 or other computing platforms.

In some embodiments, the database 114 may be hosted by a database management system ("DBMS") implemented on the computer system 102 and/or a remote database server. The data access application 110 may be a component of the DBMS. For example, the data access application 110 may represent the MICROSOFT® ACCESS® database software from Microsoft Corp. of Redmond, Wash. In other embodiments, the data access application 110 may access the database 114 over one or more networks, such as LANs, WANs, the Internet, or a combination of these and other networking infrastructure known in the art. Additionally or alternatively, the structured data 112 may be stored in any combination of files, database tables, and/or other data storage structures maintained in the computer system 102 and/or remote storage mechanisms. In further embodiments, the data access application 110 may have access to metadata 116 describing a structure of the structured data 112. The metadata 116 may be stored in the database 114 and/or be accessible through the DBMS, for example.

As further shown in FIG. 1, the user 104 accessing the data access application 110 may be associated with a locale 120. The locale 120 may indicate a region, language, cultural conventions, and the like associated with the user 104 relevant to accessing the structured data 112. For example, the locale 120 may include parameters indicating regional or cultural conventions for how date values, numbers, and the like should be displayed to the user 104 or interpreted in user input. The locale 120 may also indicate a language identifier that drives how words, codes, and/or descriptions are displayed to the user, such as a "full date" display of a date value. The locale 120 may be configured in the computer system 102 and/or data access application 110 by the user 104, or the locale 120 may be inferred from an indication of a geographical or geopolitical location of the user computing device of the user 104.

According to some embodiments, the database access application 110 may utilize the locale 120 associated with the user 104 in conjunction with filter rules 122 stored in or accessible to the computer system 102 to interpret filter terms supplied by the user 104 for filtering data in a result set using inexact and/or culture dependent terms. The filter terms may be supplied by the user 104 through a user interface, as will described below in regard to FIG. 2. Alternatively or additionally, the filter terms may be supplied through an application programming interface ("API") 124 implemented by the database access application 110 that allows a client application to filter data in a result set using inexact and/or culture dependent terms, while abstracting the complexity the mechanism described herein.

Figure 2:
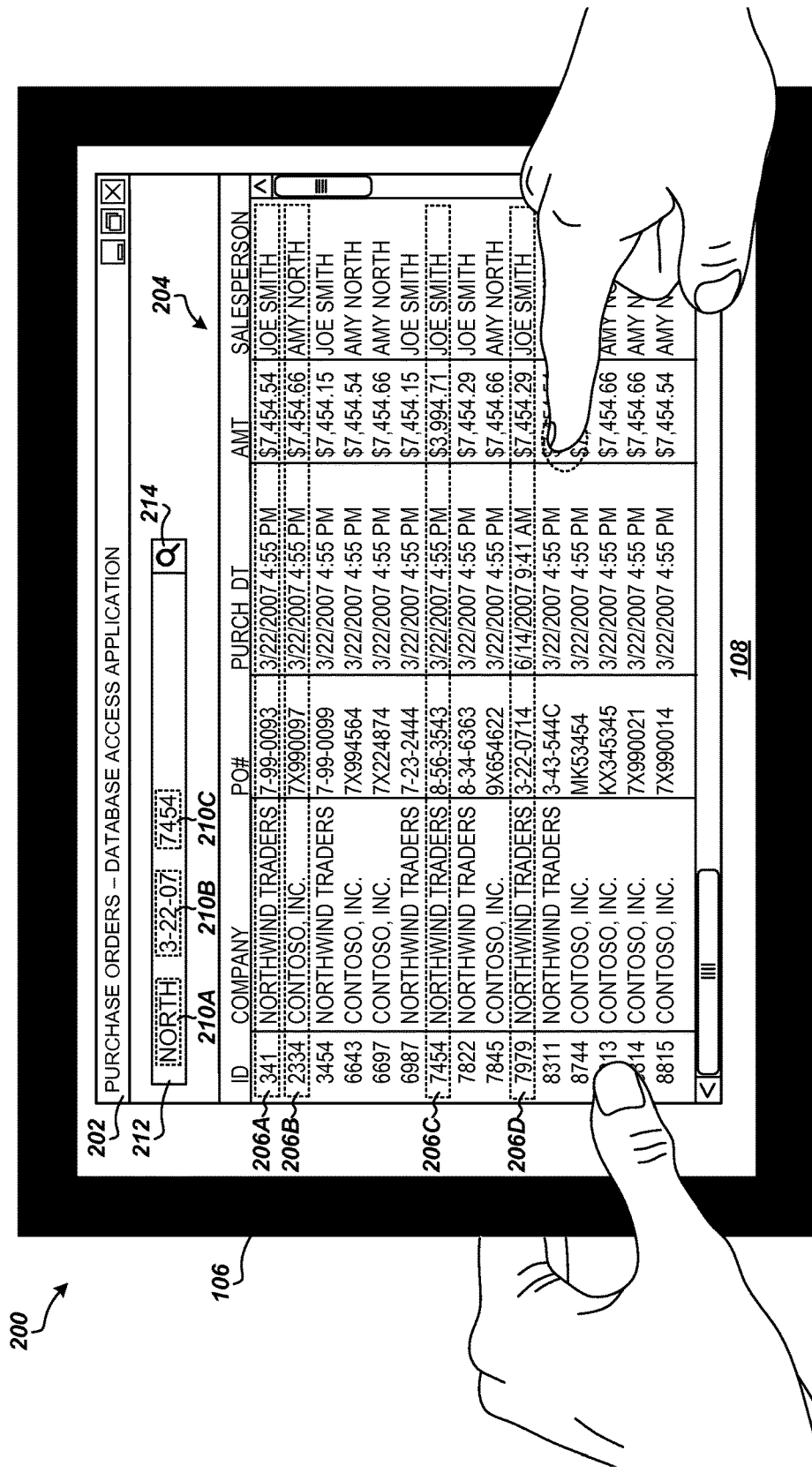
FIG. 2 is a screen diagram showing an illustrative user interface for filtering data in a result set using inexact and/or culture dependent terms, according to some embodiments described herein.

FIG. 2 shows an example of an illustrative user interface 200 displayed by the data access application 110. In some embodiments, the user interface 200 may be displayed on the display device 106 of the user computing device of the computer system 102, such the tablet device shown in FIG. 2. A user may interact with the user interface 200 by touching elements in the user interface on the touchscreen 108 of the tablet device to perform the user operations described herein. The user interface 200 may include a window 202 in which the user may view a result set 204 comprising data retrieved from the structured data 112 in the database 114. The result set 204 may comprise data retrieved from a database table, a combination of tables, and/or other data structures in the database 114, for example. The specification of a result set 204 to display in the user interface 200 may comprise an identification of a table or tables, a query submitted by the user 104 to the data access application 110, a stored query or view stored in the database 114, and the like.

The result set 204 may comprise a set of data "rows," such as rows 206A-206D (also referred to herein generally as row 206) shown in FIG. 2. Each row 206 may contain one or more values for fields or "columns" defined for the table(s) and/or other data structures in the database 114 from which the result set 204 was retrieved. For example, the columns of the result set 204 may comprise column values for the columns specified in a query or SQL expression from which the result set was generated, lookup values from associated tables or user values lists, translated values, and the like. In some embodiments, the result set 204 may contain additional column values that are not displayed as part of the rows 206 but are still "filterable" using the methods and technologies described below. In other embodiments, the columns for the result set 204 and related information may be defined in the metadata 116 in the database 114. It will be appreciated that the result set 204 may comprise other presentation or organization of the structured data 112 retrieved from the database 114 beyond that described herein, and the technologies described herein for filtering data in the result set using inexact and/or culture dependent terms may be applied to any such result sets.

According to embodiments, the user interface 200 further include a mechanism that allows the user 104 to specify one or more filter terms 210A-210C (also referred to herein generally as filter term(s) 210) that may be utilized by the data access application 110 to limit the rows 206 of the result set 204 displayed to the user. For example, the user interface may include a filter term entry box 212 in which the user may input the desired filter term(s) 210. The user interface 200 may further include a filter trigger UI control 214 that may be used to signal the data access application 110 that the entered filter term(s) 210 should be applied to the result set 204. In other embodiments, the data access application 110 may apply the entered filter term(s) 210 to the result set 204 dynamically as the terms are entered by the user 104.

As will be described in more detail below in regard to FIG. 3, the data access application 110 may apply the filter term(s) 210 to the result set 204 in order to display only those rows containing column values considered of interest to user 104 based on the specified filter term(s). In some embodiments, each individual filter term 210 may be applied as additionally restrictive on the resulting display of rows 206. In other words, by adding more filter terms 210, the number of rows 206 from the result set 204 displayed may become fewer and not greater. Further, the data access application 110 may utilize the locale 120 associated with the user 104 and/or the set of filter rules 122 to identify one or more data type interpretations for each filter term 210 to determine the scope of its application. According to some embodiments, every filter term 210 may be interpreted as containing text and may be applied to all columns in the result set 204 defined as containing text, i.e. all character-based data types. For example, as shown in FIG. 2, the filter term 210A comprising a value of "NORTH" may be applied to the COMPANY column, the PO# column, and the SALESPERSON column of the result set 204, resulting in the display of rows containing the value "NORTHWIND TRADERS" for the COMPANY column, such as rows 206A, 206C, and 206D, as well as rows containing the value "AMY NORTH" for the SALESPERSON column, such as row 206B.

In further embodiments, if a filter term 210 can be interpreted as one or more non-text data types, such as a number, date, time, datetime, or the like, then the data access application 110 may apply that filter term to both columns of text data type and columns of data types that can be compared to the interpreted data type. For example, the filter term 210B comprising a value of "3-22-07" may be applied as a text value to the COMPANY, PO#, and SALESPERSON columns (text data type), and as a date value to the PURCH_DT column (datetime data type), resulting in the inclusion of both rows 206A and 206D in the displayed result set 204.

The mapping between data type interpretations of filter terms 210 and column data types to which the filter terms may be applied may be contained in the filter rules 122, for example. In another example, a filter term 210 that can be interpreted as a date value may be applied to columns of text data type (using characters from the filter term) and columns of date or datetime data types (using the interpreted date value). Similarly, a filter term 210 that can be interpreted as a numeric value may be applied to columns of text data type (using the characters from the filter term) and columns of integer, float, currency, and other numeric data types. It will be appreciated that other mappings of interpreted data type(s) to column data types may be imagined beyond those described herein. For example, a filter term 210 with a value of "YES" may be applied to both text columns and Boolean columns in the result set 204. It is intended that all such mappings between data type interpretations of a filter term 210 and column data types to which the filter term may be applied be included in the scope of this application.

In further embodiments, the data access application 110 may provide expansions to filter terms 210 before applying them to the columns of the result set 204. Such expansions may include ranges for numeric or date values, the "spelling-out" of numeric or date values for text comparison, conversion of text to meaningful values in non-text data types, such as "Yes" to a Boolean value of TRUE, and the like. For example, a filter term 210C comprising a value of "7454" that can be interpreted as a numeric value, in addition to being applied to text columns, may be applied through a match of the numeric value to a column of integer data type, such as the ID column shown in FIG. 2. However, the same filter term 210C may be applied as a range of numeric values, such as greater than or equal to 7453.5 and less than 7455.0, to a columns of float data type, currency data type, and the like, such as the AMT column. As shown in FIG. 2, this may result in the inclusion of both rows 206A and 206C in the displayed result set 204.

It will be appreciated that the implementation of the range expansion may depend on the type of numeric value interpreted from the filter term 210. For example, a filter term 210 comprising a value of "7454" may result in a range of greater than or equal to 7453.5 and less than 7455.0, while a filter term comprising a value of "7454.4" may result in a range of greater than or equal to 7454.35 and less than 7454.50. The range expansions applied to numeric filter terms 210 may be determined using standard numerical rounding rules, or any other such rules known in the art.

Similarly, a filter term 210 that can be interpreted as a date value, such as "MARCH 21, 2007," may be applied as a range to datetime columns, such as greater than or equal to 2007-03-21-00:00:00.0 and less than 2007-03-22-00:00:00.0. A filter term that can be interpreted as partial date value, such as "MARCH 21," may be matched to any values in date or datetime columns falling on March 21. Filter terms that express numeric or date values, such as "7454," may be expanded to text, such as "SEVEN THOUSAND FOUR HUNDRED FIFTY-FOUR" for application to text columns. A single filter term 210 may be expanded to multiple text terms of different formats depending on the data type interpretations determined for the filter term 210. It will be further appreciated that other expansions of filter terms based on data type interpretations and data types of columns to which the filter terms are to be applied may be imagined beyond those described herein. For example, a filter term 210 with a value of "YES" may be expanded to a Boolean value of TRUE to be applied to Boolean columns in the result set 204. It is intended that all such expansions be included in the scope of this application. The mappings between data type interpretations of filter terms 210, column data types, and expansions to be applied to the filter terms may also be contained in the filter rules 122, as described above.

In further embodiments, the data access application 110 may utilize the locale 120 associated with the user 104 to both interpret the data type(s) expressed by a filter term 210 as well as determining the expansions of the filter term. For example, a filter term 210 comprising a value of "1,270" may be interpreted as a numeric value of 1270 for a locale 120 indicating a U.S. user, but 1.270 for a locale indicating a German user. Similarly, a filter term 210 comprising a value of "3-12-2007" may be interpreted as a date value of Mar. 12, 2007, for a locale 120 indicating a U.S. user, but Dec. 3, 2007, for a locale indicating a German user. In another example, a filter term "31. MÄRZ" may be interpreted as a numeric and a text filter for a U.S. user, but may include an additional data type interpretation of a date value of March 31 for a German user.

Figure 3:
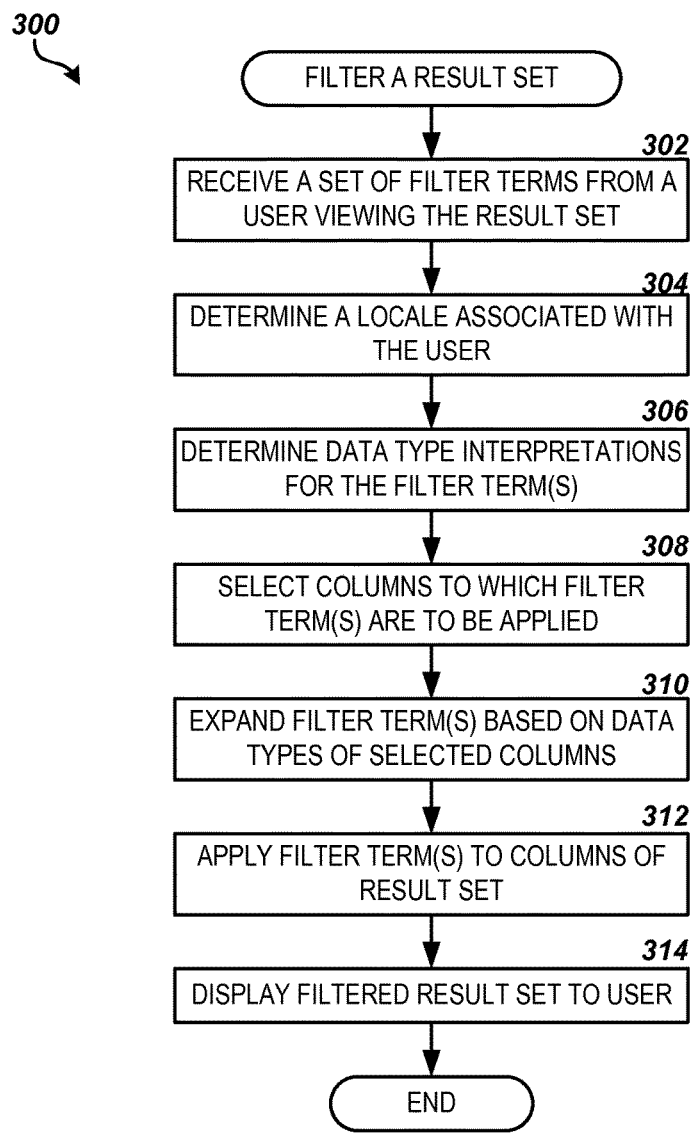
FIG. 3 is a flow diagram showing one method for filtering data in a result set using inexact and/or culture dependent terms, according to some embodiments described herein.

Referring now to FIG. 3, additional details will be provided regarding the embodiments presented herein. It will be appreciated that the logical operations described with respect to FIG. 3 may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It will also be appreciated that more or fewer operations may be performed than shown in the figures and described herein. The operations may also be performed in a different order than described.

FIG. 3 illustrates one routine 300 for filtering data in a result set 204 using inexact and/or culture dependent filter terms, such as those described herein. The routine 300 may be performed by the data access application 110, for example. It will be appreciated that the routine 300 may also be performed by other modules or components executing in the computer system 102 or in other computing devices, or by any combination of modules, components, and computing devices. The routine 300 begins at operation 302, where the data access application 110 receives one or more filter terms 210. The filter term(s) 210 may comprise one or more strings of alphanumeric characters, for example. In some embodiments, the filter term(s) 210 may be specified by a user 104 for limiting the rows 206 displayed from a result set 204 comprising data retrieved from the structured data 112 in the database 114. According to some embodiments, the filter term(s) 210 may be received through a UI, such the user interface 200 described above in regard to FIG. 2, presented by the data access application 110 to the user 104 for viewing the result set 204 on a display device 106 of the user computing device. In other embodiments, the filter term(s) 210 may be received through the API 124 implemented by the data access application 110, as discussed above in regard to FIG. 1.

From operation 302, the routine 300 proceeds to operation 304, where the data access application 110 determines a locale 120 associated with the user 104. According to some embodiments, the locale 120 may be configured in the computer system 102 and/or data access application 110 by the user 104, or the locale 120 may be inferred from an indication of a geographical or geopolitical location received from the client application executing on the user computing device. The routine 300 proceeds from operation 302 to operation 304, where the data access application 110 determines one or more data type interpretations for each of the filter terms 210. As described above in regard to FIG. 2, the data access application 110 identify one or more data type interpretations for each filter term 210 to determine the scope of its application. According to some embodiments, every filter term 210 may be interpreted as containing text and may be applied to all columns in the result set 204 defined as character-based data types. In addition, filter terms 210 that can be interpreted as one or more non-text data types, such as a number, date, time, datetime, or the like, may be applied to columns of data types that can be compared to the interpreted data type. In further embodiments, the data access application 110 may utilize the locale 120 associated with the user 104 in order to determine the non-text data types expressed by the characters or value of the filter term 210, as further described above in regard to FIG. 2.

The routine proceeds from operation 306 to operation 308, where the data access application 110 selects columns of the result set 204 to which each filter term 210 is to be applied. In some embodiments, the data access application 110 may utilize the metadata 116 retrieved from or associated with the database 114 to determine data types for the columns in the result set 204, and then utilize data type interpretation to column data types in the filter rules 122 to determine the columns to which each filter term 210 is to be applied. Next, the routine 300 proceeds to operation 310, where the data access application 110 expands one or more of the filter terms 210 based on the interpreted data types of the filter term and the data type(s) of the columns to which the filter term is being applied. As described above in regard to FIG. 2, the data access application 110 may provide expansions to filter terms 210 before applying them to the columns of the result set 204. Such expansions may include ranges for numeric or date values, the "spelling-out" of numeric or date values for text comparison, conversion of text to meaningful values in non-text data types, and the like. In some embodiments, the expansions to be applied to each filter term 210 may be determined, at least in part, from mappings between data type interpretations of filter terms, column data types, and expansions to be applied contained in the filter rules 122, as described above.

From operation 310, the routine 300 proceeds to operation 312, where the data access application 110 applies each filter terms 210 to the selected columns from the result set 204. In some embodiments, the data access application 110 may generate a query directed to the tables or other data structures of the database 114 based on the value of filter terms 210, the expansions of the filter terms, and the selected columns, and execute the query to rebuild the result set filter terms 210, and execute the generated query in order to rebuild the result set 204 to be displayed to the user 104. The query may be based on the original query submitted to the data access application for building the result set 204, the view or stored query in the database associated with the result set, or the like. In other embodiments, a specific query may be built for application of the filter terms 210 and be applied by the data access application 110 after generation of the result set 204 from the database 114. It will be appreciated that the filter terms 210 may be applied to the selected columns of the result set 204 in a number of other stages before the result set is displayed to the user 104, such as at a mid-tier service level in the DBMS architecture, for example.

As an illustration, the query for application of the filter terms 210 to the selected columns of the result set 204 may comprise an SQL expression that contains WHERE clauses built for the application of each filter term. In some embodiments, the various predicates for the application of a particular filter term 210 to the columns of the result set 204 selected for application of the filter term may be connected by ORs, causing all rows 206 containing at least one columns matching a data type interpretation of the filter term to be included in the result set 204 displayed to the user 104. For example, from the examples described above in regard to FIG. 2, the data access application 110 may add the WHERE clause "COMPANY LIKE '%7454%' OR PO# LIKE '%7454%' OR SALESPERSON LIKE '%7454%' OR ID=7454 OR (AMT>=7453.5 AND AMT<7455.0))," to the SQL expression for a filter term 210C specified with a value of "7454."

In addition, the clauses for each filter term 210 may be connected by ANDs, such that the addition of more filter terms reduces the rows 206 of the result set 204 displayed to the user 104, as opposed to increasing the rows displayed, according to some embodiments. In further embodiments, the matching of text or character-based data type interpretations of a filter term to columns in the result set 204 may be performed more broadly utilizing a full-text query engine provided by the DBMS and/or a full-text search index of the database 114. For example, the data access application 110 may add an SQL predicate to the WHERE clause of the query, such as "FREETEXT(*,'7454')" or "CONTAINS(*, '7454')" in order to search all character-type columns of the result set for the filter term 210.

It will be appreciated that the queries and SQL expressions described above for the application of the filter terms 210 to the selected columns of the result set 204 are provided for illustration purposes only, and other methods of applying each filter term to the selected columns are possible. For example, the data access application 110 may build a query object for applying the filter terms 210 to the result set 204, using classes and/or APIs provided by a DBMS. Similarly, the data access application 110 may build queries using regular expressions or other query/search syntax beyond SQL. The choice will depend on the structure of the database 114, the capabilities of the data access application 110 or the DBMS, the language syntax(es) supported for queries, and the like. It is intended that all such methods for applying the filter terms 210 to the selected columns of the result set 204 before display to the user 104 be included within the scope of this application.

From operation 312, the routine 300 proceeds to operation 314, where the data access application 110 displays the rows 206 of the result set 204 having column values that satisfy the data type interpretations determined for each filter term 210 to the user 104. For example, the "filtered" result set 204 may be displayed to the user 104 on the display device 106 in the computer system 102, as described above in regard to FIG. 1. The filtered result set 204 may be further displayed in the window 202 of the user interface 200 described above in regard to FIG. 2. As further described above, the resulting display of the result set 204 may contain fewer rows 206 than before the application of the filter terms 210, the displayed rows containing data in which the user 104 may have a specific interest, according to embodiments. From operation 314, the routine 300 ends.

Figure 4:
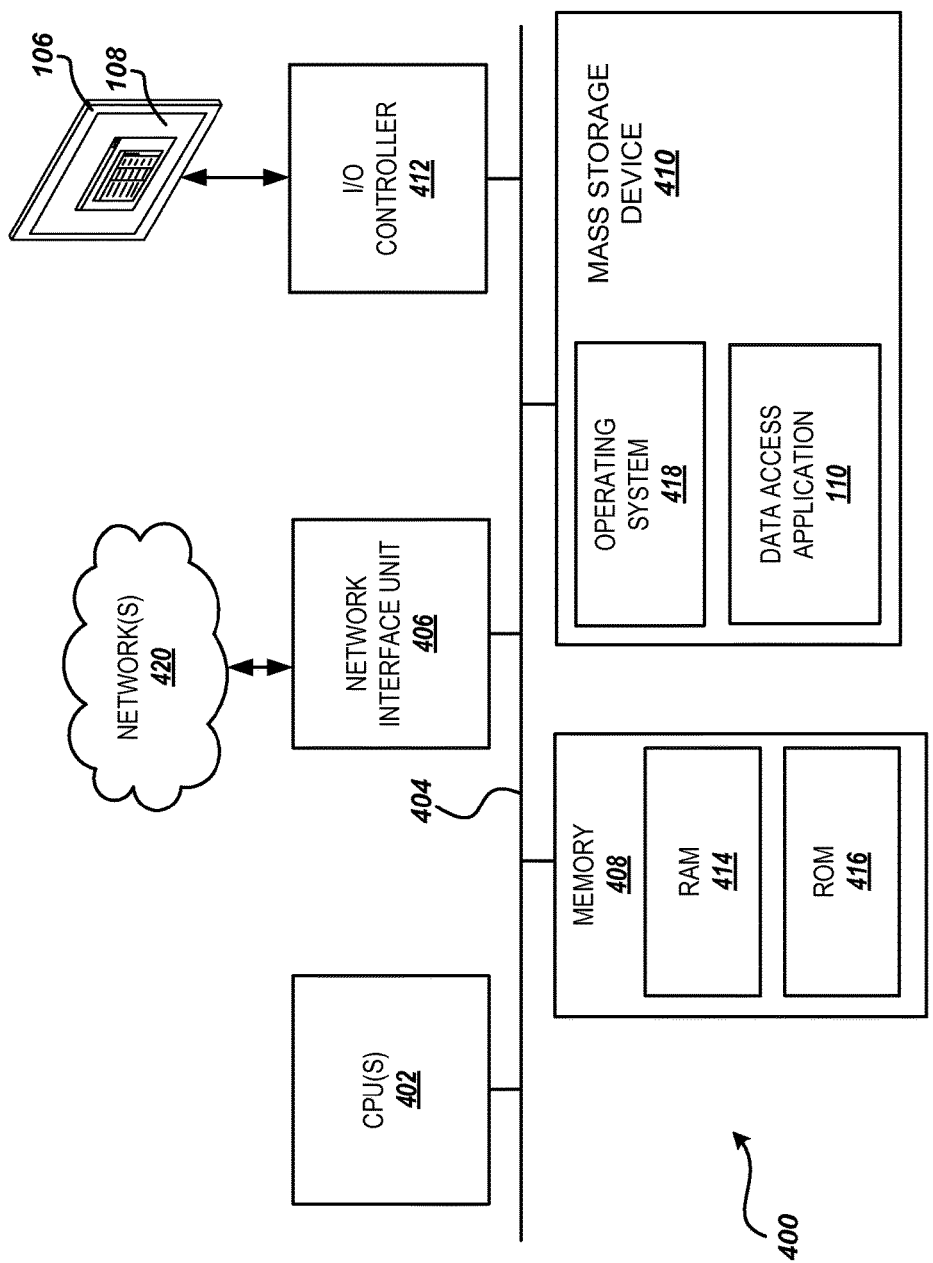
FIG. 4 is a block diagram showing an illustrative computer hardware architecture for a computing system capable of implementing aspects of the embodiments presented herein.

FIG. 4 shows an example computer architecture for a computer 400 capable of executing the software components described herein for filtering data in a result set using inexact and/or culture dependent terms, in the manner presented above. The computer 400 shown in FIG. 4 illustrates a conventional server computer, a desktop computer, laptop, notebook, PDA, wireless phone, or other computer or computing device. The computer 400 can be used to provide the functionality described herein with respect to the computer system 102, the user computing device, and/or any other computer or computing device. The computer 400 thus may be utilized to execute any aspects of the software components presented herein.

The computer 400 shown in FIG. 4 includes one or more central processing units ("CPUs") 402. The CPUs 402 may be standard processors that perform the arithmetic and logical operations necessary for the operation of the computer. The CPUs 402 perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 408, including a random access memory ("RAM") 414 and a read-only memory 416 ("ROM"), and a system bus 404 that couples the memory to the CPUs 402. A basic input/output system containing the basic routines that help to transfer information between elements within the computer 400, such as during startup, may be stored in the ROM 416. The computer 400 also includes a mass storage device 410 for storing an operating system 418, application programs, and other program modules, which are described in greater detail herein.

The mass storage device 410 may be connected to the CPUs 402 through a mass storage controller (not shown) connected to the bus 404. The mass storage device 410 provides non-volatile storage for the computer 400. The computer 400 may store information on the mass storage device 410 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 400 may store information to the mass storage device 410 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 400 may further read information from the mass storage device 410 by detecting the physical states or characteristics of one or more particular locations within the mass storage device.

As mentioned briefly above, a number of program modules and data files may be stored in the mass storage device 410 and RAM 414 of the computer 400, including an operating system 418 suitable for controlling the operation of a computer. The mass storage device 410 and RAM 414 may also store one or more program modules. In particular, the mass storage device 410 and the RAM 414 may store the data access application 110, which was described in detail above in regard to FIG. 1. The mass storage device 410 and the RAM 414 may also store other types of program modules or data.

In addition to the mass storage device 410 described above, the computer 400 may have access to other computer-readable media to store and retrieve information, such as program modules, data structures, or other data. It will be appreciated by those skilled in the art that computer-readable media may be any available media that can be accessed by the computer 400, including computer-readable storage media and communications media. Communications media includes transitory signals. Computer-readable storage media includes volatile and non-volatile, removable and non-removable media implemented in any method or technology for the non-transitory storage of information, such as computer-executable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 400.

The computer-readable storage medium may be encoded with computer-executable instructions that, when loaded into the computer 400, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 400 by specifying how the CPUs 402 transition between states, as described above. According to one embodiment, the computer 400 may have access to computer-readable storage media storing computer-executable instructions that, when executed by the computer, perform the routine 300 for filtering data in a result set using inexact and/or culture dependent terms, described above in regard to FIG. 3.

According to various embodiments, the computer 400 may operate in a networked environment using logical connections to remote computing devices and computer systems through one or more networks 420, such as a LAN, a WAN, the Internet, or a network of any topology known in the art. The computer 400 may connect to the network(s) 420 through a network interface unit 406 connected to the bus 404. It will be appreciated that the network interface unit 406 may also be utilized to connect to other types of networks and remote computer systems.

The computer 400 may also include an input/output controller 412 for receiving and processing input from a number of input devices, including the touchscreen 108 described above, a keyboard, a mouse, a touchpad, an electronic stylus, or other type of input device. Similarly, the input/output controller 412 may provide output to the display device 106, such as the touchscreen 108, a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Figure 5:
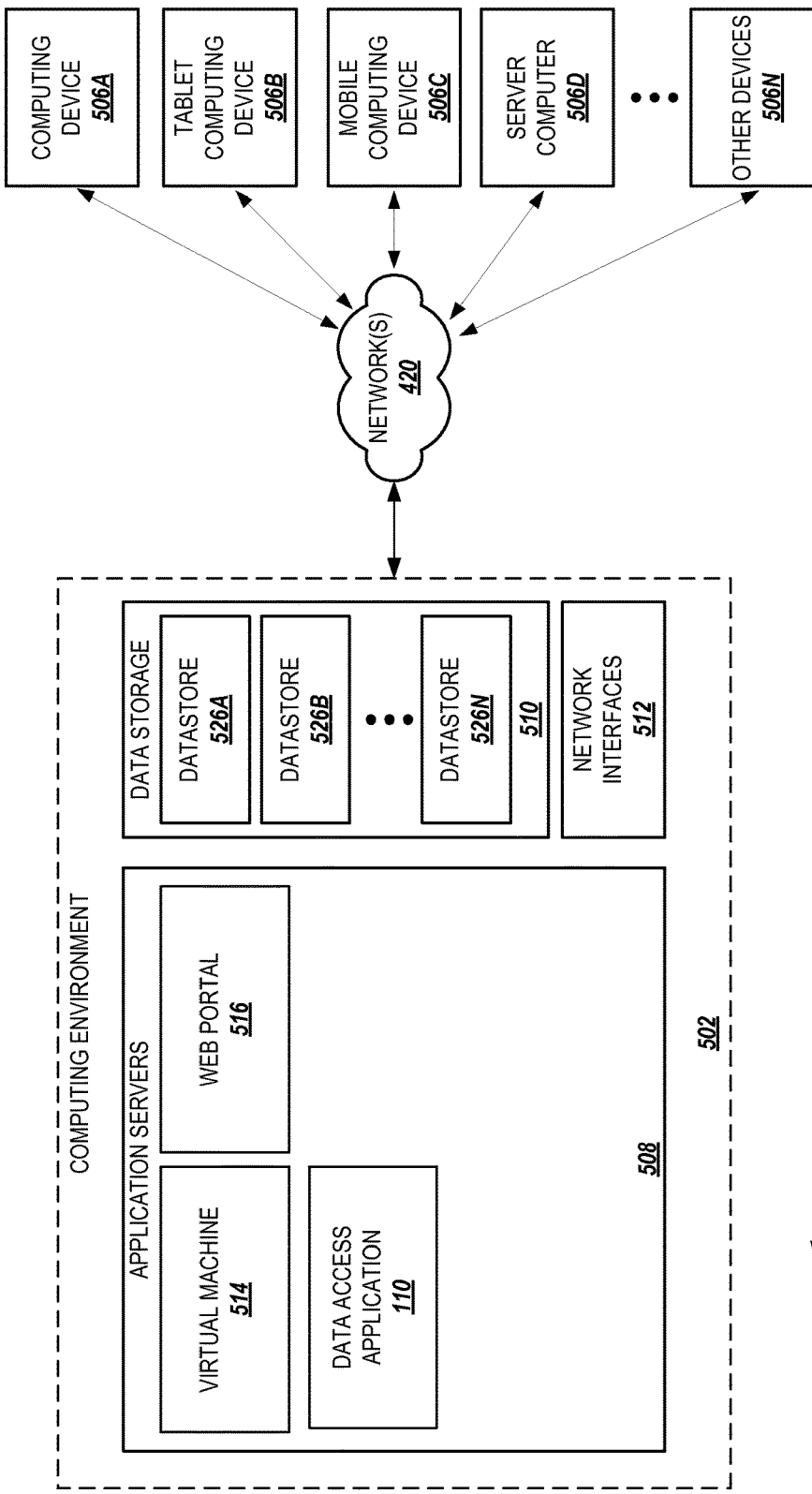
FIG. 5 is a block diagram illustrating a distributed computing environment capable of implementing aspects of the embodiments presented herein.

FIG. 5 illustrates an illustrative distributed computing environment 500 capable of executing the software components described herein for filtering data in a result set using inexact and/or culture dependent terms, in the manner presented above. The distributed computing environment 500 illustrated in FIG. 5 can be used to provide the functionality described herein with respect to the computer system 102 and/or any other computing devices. The distributed computing environment 500 thus may be utilized to execute any aspects of the software components presented herein.

According to various implementations, the distributed computing environment 500 includes a computing environment 502 operating on, in communication with, or as part of one or more networks 420. The network(s) 420 may include various access networks. One or more client devices 506A-506N (hereinafter referred to collectively and/or generically as "clients 506") can communicate with the computing environment 502 via the network(s) 106 and/or other connections (not illustrated in FIG. 5). In the illustrated embodiment, the clients 506 include a user computing device 506A, such as a laptop computer, a desktop computer, or other computing device; a tablet computing device 506B; a mobile computing device 506C such as a mobile telephone, a smart phone, or other mobile computing device; a server computer 506D; and/or other devices 506N, any of which may be represented by the user computing device of the computer system 102 described above in regard to FIG. 1. It will be understood that any number of clients 506 can communicate with the computing environment 502. It will be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein. It will be understood that this embodiment is illustrative, and should not be construed as being limiting in any way. The application servers 508 may also host or provide access to one or more Web portals, link pages, Web sites, and/or other information ("Web portals") 516.

As shown in FIG. 5, the application servers 508 also can host other services, applications, portals, and/or other resources. For example, the application servers 508 may host the data access application 110, which was described in detail above in regard to FIG. 1. As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data.

The computing environment 502 can communicate with, or be accessed by, the network interfaces 512. The network interfaces 512 can include various types of network hardware and software for supporting communications between two or more computing devices including, but not limited to, the clients 506 and the application servers 508. It will be appreciated that the network interfaces 512 also may be utilized to connect to other types of networks and/or computer systems.

It will be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It will be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for filtering data in a result set using inexact and/or culture dependent terms.

Based on the foregoing, it will be appreciated that technologies for filtering data in a result set using inexact and/or culture dependent terms are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for filtering data in a result set comprising:
   receiving, at a computer system, a filter term specified by a user of the computer system for filtering the result set being viewed on a display, the result set comprising a plurality of rows of data;
   determining, by the computer system, a locale from a geographical location of the computer system associated with the user;
   determining, by the computer system, two or more data types corresponding to the filter term using the locale and a set of rules, wherein a first of the two or more data types is text and a second of two or more data types is a data type different from text;
   determining, by the computer system, a range of values based on the filter term and the second of the two or more data types determined for the filter term;
   selecting, from the result set by the computer system, one or more columns having a data type matching one of the two or more data types corresponding to the filter term; and
   displaying, in a user interface, a limited plurality of rows of data of the result set based on filtering by the filter term, wherein at least one of the one or more columns satisfy the filter term, and wherein filtering by the filter term includes determining a value of a column is within the range of values.

2. The computer-implemented method of claim 1, wherein the filter term expresses a numeric value, and wherein the filter term is applied to both columns of the result set of numeric data types and columns of the result set of character-based data types.

3. The computer-implemented method of claim 1, wherein the filter term expresses a date value in a format specific to the locale, and wherein the filter term is applied to
   columns of the result set of date data types,
   columns of the result set of datetime data types, and
   columns of the result set of character-based data types.

4. The computer-implemented method of claim 1, wherein applying the filter terms to the selected one or more columns comprises generating a query based on the two or more data types, the selected one or more columns, and the filter term and executing the query to rebuild the result set.

5. A computer-readable storage medium encoded with computer-executable instructions that, when executed in a computer system, cause the computer system to:
   receive a filter term from a user for filtering a result set being viewed on a display, the result set comprising a plurality of rows of data;
   determine a locale from a geographical location of a computer associated with the user;
   determine two or more data types corresponding to the filter term using the locale and a set of rules, wherein a first of the two or more data types is text and a second of two or more data types is a data type different from text;
   determine a range of values based on the filter term and the second of the two or more data types corresponding to the filter term;
   select, from the result set, one or more columns having a data type matching one of the two or more data types corresponding to the filter term;
   filter by the filter term, wherein at least one of the one or more columns satisfy the filter term, and wherein a value of a column having an associated data type is within the range of values in the result set; and
   display the limited plurality of rows of data to the user on a display device.

6. The computer-readable storage medium of claim 5, encoded with further computer-executable instructions that cause the computer to:
   expand the filter term based on one of the two or more data types corresponding to the filter term and a data type of a selected column; and
   include rows wherein a value of the selected column satisfies the expanded filter term in the result set displayed to the user.

7. The computer-readable storage medium of claim 5, wherein the filter term expresses a numeric value in a format specific to the locale, and wherein the filter term is applied to both columns of the result set of numeric data types and columns of the result set of character-based data types.

8. The computer-readable storage medium of claim 5, wherein the filter term expresses a date value in a format specific to the locale, and wherein the filter term is applied to columns of the result set of date data types, columns of the result set of datetime data types, and columns of the result set of character-based data types.

9. The computer-readable storage medium of claim 5, wherein applying the filter term to the selected one or more columns comprises generating a query based on the two or more data types corresponding to the filter term, the selected one or more columns, and the filter term and executing the query to rebuild the result set.

10. A system for filtering data in a result set, the system comprising:
one or more processing units;
a memory operatively coupled to the one or more processing units; and
a data access application residing in the memory and configured to cause the one or more processing units to:
receive a filter term for filtering the result set displayed to a user;
determine two or more data types corresponding to the filter term using the locale and a set of rules, wherein a first of the two or more data types is text and a second of two or more data types is a data type different from text;
determine a range of values based on the filter term and the second of the two or more data types corresponding to the filter term;
select, from the result set, one or more columns having a data type matching one of the two or more data types corresponding to the filter term; and
display, in a user interface, a limited plurality of rows of data of the result set based on filtering by the filter term, wherein at least one of the one or more columns satisfy the filter term and wherein a value of a column having an associated data type is within the range of values in the result set.

11. The system of claim 10, wherein the data access application is further configured to:
expand the filter term based on one of the two or more data types and the data type of a selected column; and
limit the set of rows in the result set displayed to the user to rows wherein a value of the selected column satisfies the expanded filter term.

12. The system of claim 10, wherein the filter term expresses a numeric value in a format specific to the locale, and wherein the filter term is applied to both columns of the result set of numeric data types and columns of the result set of character-based data types.

13. The system of claim 10, wherein the filter term expresses a date value in a format specific to the locale, and wherein the filter term is applied to columns of the result set of date data types, columns of the result set of datetime data types, and columns of the result set of character-based data types.

14. The system of claim 10, wherein applying the filter terms to the selected one or more columns comprises generating a query based on the two or more data types, the selected one or more columns, and the filter term and executing the query to rebuild the result set.

15. The computer-implemented method of claim 2, wherein the result set includes an expanded range of numeric values, wherein the expanded range includes numeric values greater than or less than the numeric value of the filter term.

16. The computer-implemented method of claim 2, wherein applying the filter term expressing a numeric value to columns of the result set of character-based data types comprises spelling out the numeric value for text comparison.

17. The computer-implemented method of claim 3, wherein the result set includes an expanded range of date values, wherein the expanded range includes date values greater than or less than the date value of the filter term.

18. The computer-implemented method of claim 3, wherein applying the filter term expressing a date value to columns of the result set of character-based data types comprises spelling out the date value for text comparison.

* * * * *